United States Patent [19] [11] 3,873,979
Craford et al. [45] Mar. 25, 1975

[54] LUMINESCENT SOLID STATE STATUS INDICATOR
[75] Inventors: Magnus G. Craford, St. Louis; David L. Keune, Chesterfield, both of Mo.
[73] Assignee: Monsanto Company, St. Louis, Mo.
[22] Filed: Sept. 28, 1973
[21] Appl. No.: 401,775

[52] U.S. Cl. ...... 340/366 R, 317/235 R, 313/108 R
[51] Int. Cl. .......................................... H05b 33/00
[58] Field of Search. 340/366 R; 313/108 D, 108 R; 317/235 R

[56] References Cited
UNITED STATES PATENTS
3,603,833  9/1971  Logan .......................... 313/108 D
3,611,069  10/1971  Galginaitis ..................... 317/235 R
3,740,570  6/1973  Kaelin ............................. 307/40

Primary Examiner—Harold I. Pitts

[57] ABSTRACT

Luminescent indicators are disclosed employing at least two solid state light emitting devices packaged on a single header. The devices have one "state" at low currents or voltages and have another "state" at higher currents or voltages. A change of state of the devices may cause either the color of the status indicator to change or the light from the status indicator to change from continuous to flashing. The status indicator may provide a continuous change of state or a series of discrete levels or states. The light emitting devices are preferably semiconductor p-n junction devices with the logic or switching element of the devices packaged on the same header either as a separate circuit or incorporated into the light emitting semiconductor devices themselves. The status indicators have two or more terminals depending on the specific desired application.

13 Claims, 7 Drawing Figures

PATENTED MAR 25 1975  3,873,979

LUMINESCENT SOLID STATE STATUS INDICATOR

BACKGROUND OF THE INVENTION

1. Field of the Invention

The present invention relates generally to indicating devices, and more particularly to luminescent solid state status indicators capable of indicating a changing condition.

2. Description of the Prior Art

There are many consumer applications including automobiles, household appliances and the like wherein a meter has been replaced with a simple lamp circuit for purposes of economy. A familar application of such a lamp circuit is as a substitute for the ammeter and oil pressure gages in the typical automobile instrument panel. While the lamp is capable of indicating a faulty condition, such as battery discharge or dangerously low oil pressure, it cannot indicate a changing condition or, for that matter, the direction from which the change is taking place. Thus, economy has been realized at the sacrifice of the ability to transmit information to the operator of the automobile, appliance or the like.

It is highly desirable to provide a luminescent status indicator which is capable not only of indicating a faulty condition but is also capable of indicating a changing condition. Such a status indicator would not only be valuable in consumer applications but could be used for many measurements in industrial applications where a meter or gage is presently being employed. In addition, where the preciseness of the measurement provided by a meter or gage is required, such status indicators could be used in conjunction with the meter or gage to attract the attention of the operator.

SUMMARY OF THE INVENTION

It is therefore an object of the present invention to provide a luminescent solid state status indicator which is capable of providing considerably more information than presently known simple fault indicating lamp circuits.

The foregoing and other objects of the invention are attained by providing two solid state light emitting diodes packaged on a single header. The two light emitting diodes may emit the same color light but in most applications would emit two different colors of light. If one diode is chosen to emit green light and the other is chosen to emit red light, the indicator can be constructed to provide two discrete outputs depending on the status of the condition being monitored. For example, in an automobile the indicator could be used as a battery charge/discharge indicator with a green light indicating a charge condition and a red light indicating a discharge condition. Even more information can be provided by the indicator if the change in conduction of the two diodes is continuous resulting in a continuous change of color hue of the indicator. For example, the fuel level in an automobile could be indicated by such an indicator changing from green when full to yellow and red as the fuel level is reduced.

BRIEF DESCRIPTION OF THE DRAWINGS

The specific nature of the invention, as well as other objects, aspects, uses and advantages thereof, will clearly appear from the following description and from the accompanying drawing in which.

DESCRIPTION OF THE PREFERRED EMBODIMENTS

Figure 1A:
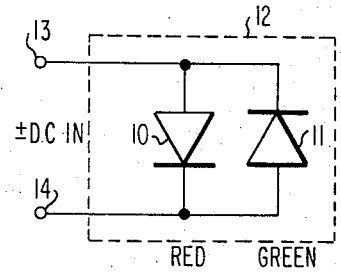
FIG. 1A is a schematic diagram illustrating one embodiment of a two-color indicator according to the present invention.

Referring now to the drawings and more particularly to FIG. 1A, one embodiment of the status indicator according to the invention basically consists of two light emitting diodes 10 and 11 inverted in parallel on a single clear diffused epoxy header 12. Two terminals 13 and 14 electrically connected across the parallel connection of the diodes 10 and 11 are provided on the header 12 and adapted to be connected across a source of voltage which is indicative of the condition being monitored. In the specific embodiment illustrated, diode 10 is a red emitting diode such as a GaAsP p-n junction diode, and diode 11 is a green emitting diode such as a GaP p-n junction diode. The color of the indicator depends on the net direction of current flow through the device. For example, if terminal 13 is positive with respect to terminal 14, current will flow through diode 10 but not diode 11 with the result being that a red light will be emitted. On the other hand, if terminal 14 is positive with respect to terminal 13 then a current will flow through diode 11 causing a green light to be emitted. Of course, if terminals 13 and 14 are the same potential, no current will flow and no light will be emitted.

In an automobile the single indicator illustrated in FIG. 1A could be used as a battery charge/discharge indicator as mentioned above, and it would provide considerably more information than the present red warning light. In another application in audio equipment, the indicator could be used as a tuning indicator in much the same way as a null reading meter is presently used. In aircraft, yet a third state can be provided if the voltage across terminals 13 and 14 is an alternating current voltage. Under these conditions, the indicator would have the appearance of two distinct light sources, red and green, placed side-by-side. Alternatively, the epoxy header 12 could be made to diffuse the light from the diodes 10 and 11 in such a manner that the combined light from the two diodes would appear as yellow.

Figure 1B:
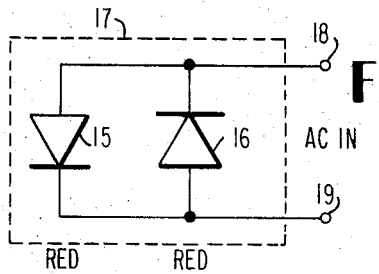
FIG. 1B is a schematic diagram of a variation of the embodiment in FIG. 1A providing only one color suitable for providing a flashing indication.

FIG. 1B illustrates a variation of the embodiment of FIG. 1A wherein both of the diodes 15 and 16 on the single epoxy header 17 emit the same color, i.e., red. This arrangement has a more limited application than that of FIG. 1A and requires an alternating current voltage to be applied across the terminals 18 and 19. A particularly useful application of this variation is as a flashing indicator. Such an application requires that the voltage applied across terminals 18 and 19 be a series of alternate polarity pulses having a frequency sufficiently low to enable the human eye to perceive the alternate conduction of diodes 15 and 16.

Figure 2:
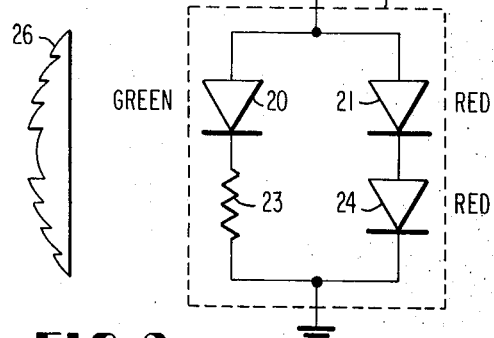
FIG. 2 is a schematic diagram of another embodiment of the indicator according to the invention which provides a continuous change in hue of color dependent on the status of the condition being monitored.

Referring now to FIG. 2, a two terminal indicator is illustrated which is capable of continuously varying hue from red through green. This indicator comprises a green light emitting diode 20 and a red light emitting diode 21 having their anodes connected in common to terminal 22 adapted to be connected to a source of positive voltage. Diode 20 is connected in series with a resistor 23 between terminal 22 and a second terminal or ground. Diode 21 is connected in series with a third diode 24 between the terminal 22 and ground. As illustrated in FIG. 2, diode 24 could be a red light emitting diode identical to diode 21; however, this is not essential, and the function of diode 24 will be explained in detail with respect to FIG. 3. Diodes 20, 21 and 24 and resistor 23 are all packaged on a single epoxy header 25. The epoxy header 25 may include a diffusing lens 26 illustratively depicted as a separate Fresnel lens in the figure. It will be understood, however, that the preferred construction would incorporate the lens 26 and the header 25 in a unitary structure.

Figure 3:
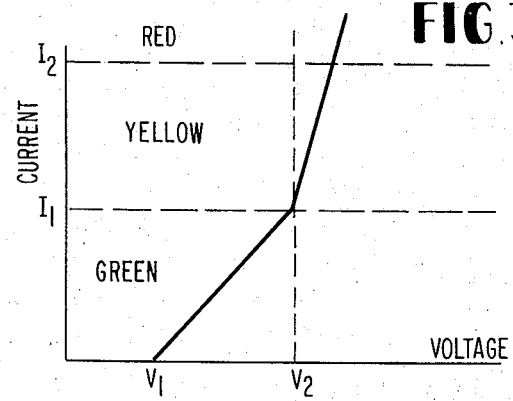
FIG. 3 is a graph illustrating the operation of the circuit shown in FIG. 2.

FIG. 3 shows the current/voltage characteristic for the circuit of FIG. 2. At voltage $V_1$, which is related to the forbidden energy gap of the green emitting diode 20, diode 20 begins to conduct. Between voltages $V_1$ and $V_2$, the slope of the current/voltage curve is determined by the value of the resistor 23. For currents less than $I_1$, the status indicator will be green. At voltage $V_2$, which is approximately equal to twice the forbidden energy gap of the red emitting diodes 21 and 24, these diodes will begin to conduct. Since the series resistance of diodes 21 and 24 is lower than that of diode 20 and resistor 23, red light dominates for currents greater than $I_2$. For currents between $I_1$ and $I_2$ there is appreciable red and green emission from the indicator with a resultant change from green through yellow - green, yellow, and orange to red. In order to obtain good mixing of the red and green colors to provide the varying hues in between, the diffusing lens 26 is required.

It will be appreciated that the principle purpose of a second red emitting diode 24 is to establish the voltage level at the point which the red side of the circuit in FIG. 2 will begin to conduct. As a result, other devices which are not light emitting diodes such as conventional diodes or devices exhibiting a voltage/current breakdown such as a Zener may be substituted.

Figure 4:
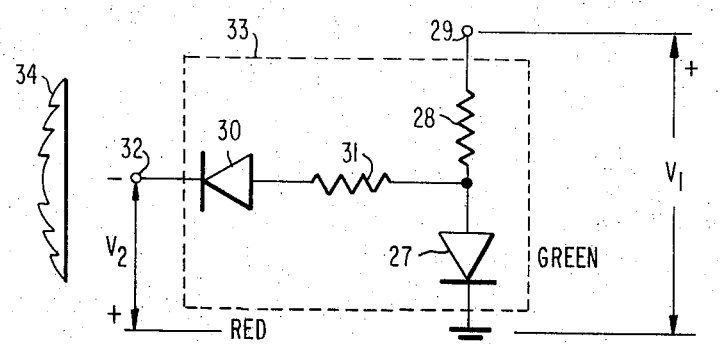
FIG. 4 is a schematic diagram of yet another embodiment of the status indicator according to the invention also providing a continuous change in hue of color dependent on the status of the condition being monitored.

In many status indication applications where it is desirable to generate light of the continuously and uniformly changing color as a function of an applied voltage or current, it is also desirable to have a device which has constant brightness. This can be achieved by mixing the light emitted from two distinct color light emitting diodes in the circuit shown in FIG. 4. In this circuit a green light emitting diode 27 has its anode connected in series with resistor 28 to terminal 29. The cathode of diode 27 is connected to a second terminal or ground. The red light emitting diode 30 has its anode connected in series with a resistor 31 to the junction between diode 27 and resistor 28. The cathode of diode 30 is connected to a third terminal 32. Both of diodes 27 and 30 and both of resistors 28 and 31 are packaged on the single epoxy header 33 which, again, incorporates a diffusing lens 34 in a single unitary structure. An energizing or biasing voltage $V_1$ is connected across the terminal 29 and ground in the polarity indicated in the drawing. A source of voltage indicative of the condition being monitored is connected across terminal 32 and ground in the polarity indicated in the drawing.

Figure 5:
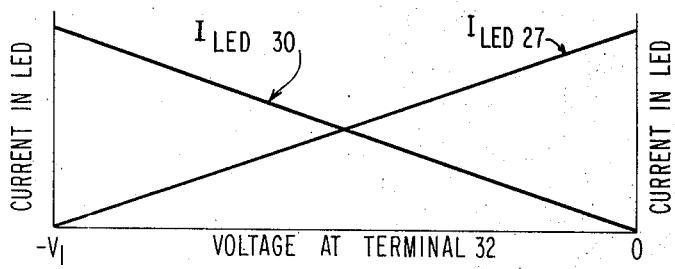
FIGS. 5 and 6 are graphs illustrating the operation of a circuit of FIG. 4.
Figure 6:
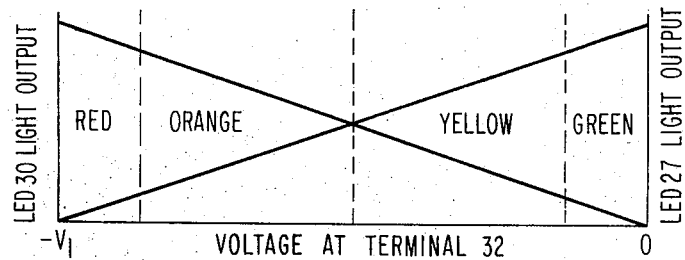

The electrical operation of the circuit is straight forward. Assume that the values of resistors 28 and 31 are approximately the same and roughly ten times greater than the series resistances of diodes 27 and 30. With no signal applied to terminal 32, the voltage $V_1$ in conjunction with the value of resistor 28 is selected to yield the desired current and light level for diode 27. Upon application of an increasingly negative voltage, $V_2$, at terminal 32, the current through diode 30 increases while the current through diode 27 decreases. This operation is illustrated in FIG. 5. Since the light output generated by a light emitting diode is roughly proportional to the forward current through it, the variation in light output versus the voltage, $V_2$, at terminal 32 is illustrated in FIG. 6. Typically, red emitting diodes have a brightness that is approximately three times that of green emitting diodes. Thus, it will be appreciated that a number of diodes may be employed for the single diodes illustrated in the figure in order to obtain a match in brightness. With the number of diodes constituting diodes 27 and 30 adjusted such that for a given current each diode 27 and 30 yields the same current brightness, the color of the indicator illustrated in FIG. 4 would change continuously from green to red as the voltage, $V_2$, is changed from zero to $-V_1$.

The description has enumerated only a few specific applications of the indicator according to the invention, but there are an almost unlimited number of applications not specifically enumerated. For example, parameters which could be measured, in conjunction with suitable sensing devices, include temperature, pressure, revolutions per minute, current, voltage, etc. It will be apparent that the embodiments shown are only exemplary and that various modifications can be made in construction and arrangement within the scope of the invention as defined in the appended claims.

What is claimed is:

1. A luminescent solid state status indicator characterized by:
   at least first and second light emitting diodes mounted on a single header;
   first terminal means on said header connected to both light emitting diodes and adapted to be connected to a first terminal of a direct current energizing voltage;
   second terminal means on said header connected to at least one of the light emitting diodes and adapted to be connected to a second terminal of said direct current energizing voltage; and
   said light emitting diodes being adapted to emit light the color of which shifts as a function of relative change in magnitude of said direct current energizing voltage.

2. A luminescent solid state status indicator as recited in claim 1 wherein at least one of said light emitting diodes comprises a red light emitting GaAsP diode.

3. A luminescent solid state status indicator as recited in claim 1 wherein one of said light emitting diodes is a green light emitting GaP diode and the other of said light emitting diodes is a red light emitting GaAsP diode.

4. A luminescent solid state status indicator as recited in claim 1 wherein said first light emitting diode is connected to said second terminal means by a resistor and said second light emitting diode is connected to said second terminal means by a third diode.

5. A luminescent solid state status indicator as recited in claim 4 wherein said first and second light emitting diodes are poled in the same direction, and emit different colors of light, and said first light emitting diode conducting at a lower value of voltage connected across said first and second terminal means than that required for conduction in said second light emitting diode as determined by the biasing characteristics of said third diode.

6. A luminescent solid state status indicator as recited in claim 5 wherein said third diode is a light emitting diode identical to said second light emitting diode.

7. A luminescent solid state status indicator as recited in claim 5 further comprising means for diffusing the light from said first and second light emitting diodes.

8. A luminescent solid state status indicator as recited in claim 7 wherein said first light emitting diode is a green light emitting GaP diode and said second light emitting diode is a red light emitting GaAsP diode, and said diffusing means causes the light from said indicator to change from green through yellow - green, yellow, and orange to red as said energizing voltage increases.

9. A luminescent solid state status indicator as recited in claim 1 wherein said first light emitting diode is connected to said first terminal means by a first resistor and said second light emitting diode is connected to said first terminal means by said first resistor and a second resistor.

10. A luminescent solid state status indicator as recited in claim 9 wherein said second terminal means is connected to said first light emitting diode, and further comprising third terminal means on said header connected to said second light emitting diode and adapted to be connected to a source of voltage indicative of a condition to be monitored.

11. A luminescent solid state status indicator as recited in claim 10 wherein said first and second light emitting diodes emit different colors of light and have like poles connected to said first terminal means by said first resistor and said first and second resistors, respectively.

12. A luminescent solid state status indicator as recited in claim 11 further comprising means for diffusing the light from said first and second light emitting diodes.

13. A luminescent solid state status indicator as recited in claim 12 wherein said first light emitting diode is a green light emitting GaP diode and said second light emitting diode is a red light emitting GaAsP diode, said energizing voltage is a direct current voltage and said source of voltage is a direct current voltage variable from zero to a value equal in magnitude but opposite in polarity to said energizing voltage, and said diffusing means causes the light from said indicator to change from green through yellow - green, yellow, and orange to red as the magnitude of said source of voltage increases.

* * * * *